(12) United States Patent
Kitano

(10) Patent No.: US 9,060,070 B2
(45) Date of Patent: Jun. 16, 2015

(54) INFORMATION TERMINAL APPARATUS

(75) Inventor: Takashi Kitano, Osaka (JP)

(73) Assignee: KYOCERA Corporation, Kyoto (JP)

( * ) Notice: Subject to any disclaimer, the term of this patent is extended or adjusted under 35 U.S.C. 154(b) by 692 days.

(21) Appl. No.: 12/746,979

(22) PCT Filed: Dec. 10, 2008

(86) PCT No.: PCT/JP2008/072393
§ 371 (c)(1),
(2), (4) Date: Jun. 9, 2010

(87) PCT Pub. No.: WO2009/075285
PCT Pub. Date: Jun. 18, 2009

(65) Prior Publication Data
US 2010/0268721 A1 Oct. 21, 2010

(30) Foreign Application Priority Data
Dec. 10, 2007 (JP) .................. 2007-318460

(51) Int. Cl.
G06F 17/30 (2006.01)
H04M 1/725 (2006.01)
G06F 3/023 (2006.01)
(Continued)

(52) U.S. Cl.
CPC ......... *H04M 1/72552* (2013.01); *G06F 3/0237* (2013.01); *G06F 17/2235* (2013.01); *G06Q 10/10* (2013.01); *G06Q 10/109* (2013.01)

(58) Field of Classification Search
USPC ............................ 707/758, 701, 690, 999.003
See application file for complete search history.

(56) References Cited

U.S. PATENT DOCUMENTS 4,450,520 A * 5/1984 Hollaar et al. .................. 710/65
5,051,947 A * 9/1991 Messenger et al. ................ 1/1
(Continued)

FOREIGN PATENT DOCUMENTS

JP 10-301869 11/1998
JP 2001-309074 A 11/2001
(Continued)

OTHER PUBLICATIONS

Notification of Reason for Rejection dated Oct. 2, 2012, issued in counterpart Japanese Application No. 2007-318460.
(Continued)

Primary Examiner — Mohammed R Uddin
(74) Attorney, Agent, or Firm — Procopio, Cory, Hargreaves & Savitch LLP

(57) ABSTRACT

The information terminal device according to the present invention is provided with a memory and a control circuit. The control circuit is provided with means for storing operation pattern information including character string pattern information and operation information in the memory, means for searching, when a document is displayed on the display, character string information that matches the character string pattern information stored in the memory in the document, and means for specifying, when an operation of selecting one piece of character string information is performed, operation pattern information including character string pattern information that matches the character string information selected from the plurality of pieces of operation pattern information stored in the memory and starting an application software program specified by the operation information included in the specified operation pattern information.

8 Claims, 12 Drawing Sheets

(51) Int. Cl.
*G06F 17/22* (2006.01)
*G06Q 10/10* (2012.01)

(56) References Cited

U.S. PATENT DOCUMENTS

| | | | |
|---|---|---|---|
| 5,140,644 A * | 8/1992 | Kawaguchi et al. | 382/226 |
| 5,754,686 A * | 5/1998 | Harada et al. | 382/187 |
| 5,870,741 A * | 2/1999 | Kawabe et al. | 1/1 |
| 5,963,942 A * | 10/1999 | Igata | 1/1 |
| 7,054,666 B2 | 5/2006 | Shibuya | |
| 7,912,828 B2 * | 3/2011 | Bonnet et al. | 707/706 |
| 7,962,168 B2 * | 6/2011 | Ajiro | 455/550.1 |
| 8,126,913 B2 * | 2/2012 | Catucci et al. | 707/780 |
| 2001/0044326 A1 | 11/2001 | Shibuya | |
| 2004/0018857 A1 * | 1/2004 | Asokan et al. | 455/564 |
| 2006/0163337 A1 * | 7/2006 | Unruh | 235/145 A |
| 2006/0190819 A1 * | 8/2006 | Ostergaard et al. | 715/534 |
| 2008/0058007 A1 * | 3/2008 | Kang | 455/556.1 |
| 2009/0281786 A1 * | 11/2009 | Ando et al. | 704/2 |
| 2010/0010994 A1 * | 1/2010 | Wittig et al. | 707/6 |
| 2010/0191826 A1 * | 7/2010 | Tsurukiri et al. | 709/217 |

FOREIGN PATENT DOCUMENTS

| | | |
|---|---|---|
| JP | 2001-325060 | 11/2001 |
| JP | 2007-079880 | 3/2007 |

OTHER PUBLICATIONS

Office Action dated Jul. 20, 2011, issued in counterpart Korean Patent Application No. 10-2010-7012699.

* cited by examiner

| PATTERN NAME | CHARACTER STRING PATTERN | OPERATION | OPTION | VALIDITY |
|---|---|---|---|---|
| PATTERN 1 | YYMM<br>YY/MM/DD | SCHEDULER | 01 | 1 |
| PATTERN 2 | HHmm<br>MMDD | ALARM CLOCK | 11 | 1 |
| PATTERN 3 | XX MINUTES | COUNT DOWN TIMER | 00 | 0 |

```
                              2007/01/10  11:23
From:AAA
Sub : REGARDING XXX MEETING
HELLO,
LET'S HAVE MEETING
ON 2007/01/23 AT 10:00
AT SAME PLACE.
```

FIG. 15

```
                              2007/01/14  12:00
From:ABB
Sub : NOTICE
I'LL BE ARRIVING
AT STATION
IN ABOUT 10 MINUTES.
```

FIG. 16

```
                              2007/01/30  21:15
From:CCC
Sub : REQUEST
PLEASE BUY ToDo:○○.
```

FIG. 17

```
                              2007/01/24  22:00
From:DDD
Sub : NOTICE
I REMEMBER.
WHEN WE MEET NEXT TIME
ON 2/1, PLEASE REMEMBER
TO BRING ToDo:▲▲.
```

INFORMATION TERMINAL APPARATUS

FIELD OF THE INVENTION

The present invention relates to an information terminal device such as a cellular phone set that has a plurality of functions.

BACKGROUND

Conventionally, cellular phone sets which are in widespread use are provided with a plurality of functions such as an e-mail communication function and a function of browsing sites on the Internet and mounted with a plurality of application software programs for realizing the plurality of functions. To improve convenience, the application software programs on the cellular phone sets are made to link with each other, as will be described later.

That is, the cellular phone sets register character string information in association with operation information for specifying an application software program to be started and when a received mail document or document of a site on the Internet or the like is displayed on a display, character string information that matches the registered character string information is searched in the document, and later when the user operates the cursor and if character string information obtained as a result of the search exists at the cursor destination, the character string information is displayed in reverse video. When the user presses the Enter key in this condition, an application software program specified by the operation information registered in association with the character string information that matches the character string information is started and an application screen is displayed on the display.

In a cellular phone set with which, for example, "http://" and "mail to:" are registered as character string information, when the user moves the cursor to a URL including character string information "http://" while a mail document is displayed on the display, the URL is displayed in reverse video and if the user presses the Enter key in this condition, an application software program for browsing a site on the Internet is started and the site having the URL is displayed on the display. Furthermore, when the user moves the cursor to character string information "mail to:" while the site on the Internet is shown, the character string information is displayed in reverse video and if the user presses the Enter key in this condition, an application software program for sending/receiving e-mail is started and a screen for creating e-mail is displayed on the display.

As described above, while a mail document or document of a site on the Internet or the like is displayed on the display, if character string information in the document is selected through cursor operation, an application software program corresponding to the character string information is started and an application screen is displayed on the display, and therefore a high degree of convenience is obtained.

A cellular phone set is proposed which allows mutual links between different functions to be realized through simple operation. In such a cellular phone set, while an e-mail screen is displayed on the display if a predetermined key operation is performed, a keyword search is performed from the text of the e-mail and the search result is displayed on a confirmation form screen. When the predetermined key operation is performed in this condition, a schedule screen in which contents of the e-mail are registered is displayed on the display.

SUMMARY OF THE INVENTION

However, the conventional cellular phone set does not allow the user to change or add character string information and operation information, and therefore has a problem that a sufficiently high degree of convenience cannot be obtained.

It is therefore an object of the present invention to provide an information terminal device such as a cellular phone set having a higher degree of convenience than conventional ones.

The information terminal device according to the present invention has a plurality of functions and each application software program for realizing each function shows an application screen on an information display device when the application software program is started. The information terminal device is provided with an information input device, information storing means for storing operation pattern information including character string pattern information made up of character information made up of characters, numbers or symbols, attribute information indicating attributes of characters, numbers or symbols or a combination of such information and operation information for specifying an application software program, information processing means for storing operation pattern information including character string pattern information and operation information in the information storing means according to an information input operation on the information input device, searching means for searching, when a document including one or a plurality of pieces of character string information is displayed on the information display device, one or a plurality of pieces of character string information that match the character string pattern information stored in the information storing means in the document, search result display processing means for displaying the search result of the searching means, and starting means for specifying, when an operation of selecting one piece of character string information from one or a plurality of pieces of character string information obtained as a result of the search by the searching means on the information input device, operation pattern information including character string pattern information that matches the selected character string information from the plurality of pieces of operation pattern information stored in the information storing means and starting an application software program specified by the operation information included in the specified operation pattern information.

The user performs an information input operation on the information input device beforehand and thereby sets operation pattern information including character string pattern information and operation information in the information terminal device.

Later, when a document including one or a plurality of pieces of character string information is displayed on the information display device, character string information that matches the set character string pattern information is searched in the document and the search result is displayed on the information display device. Next, when the user performs an operation of selecting one piece of character string information from the one or the plurality of pieces of character string information obtained as a result of the search on the information input device, operation pattern information including the character string pattern information that matches the character string information selected from the set operation pattern information is specified, an application software program specified by the operation information included in the operation pattern information is started and an application screen is displayed on the information display device.

The information terminal device according to the present invention allows the user to set operation pattern information as described above, and can thereby achieve a higher degree of convenience than conventional ones.

To be more specific, the information terminal device includes operation pattern information display processing means for displaying the operation pattern information stored in the information storing means on the information display device according to an information display operation on the information input device, read processing means for reading, when an operation of selecting one piece of operation pattern information from the operation pattern information displayed on the information display device is performed on the information input device, the selected operation pattern information from the information storing means, and change processing means for changing the operation pattern information read by the read processing means according to an information change operation on the information input device and storing the operation pattern information in the information storing means.

According to the above described detailed configuration, it is possible to change the set operation pattern information by performing an information change operation on the information input device.

Furthermore, to be more specific, the search result display processing means displays a search result by the searching means while the document is displayed on the information display device, and when a cursor operation is performed on the information input device while the document is displayed on the information display device, if the character string information obtained as a result of the search by the searching means exists at the cursor destination, the search result display processing means displays the character string information in such a way that the character string information is visually distinguishable from other character string information.

According to the above described detailed configuration, if the user performs a cursor operation while a document is displayed on the information display device, when character string information obtained as a result of the search exists at the cursor destination, the character string information is displayed in such a way that the character string information is visually distinguishable from other character string information, for example, displayed in reverse video. This allows the user to recognize that the character string information matches the set character string pattern information.

To be more specific, the operation pattern information includes character string information supply necessity information that indicates whether or not character string information needs to be supplied to an application software program, and when the character string information supply necessity information included in the specified operation pattern information indicates that character string information needs to be supplied to an application software program, the starting means supplies the selected character string information to an application software program specified by the operation information included in the specified operation pattern information.

According to the above described detailed configuration, when the character string information supply necessity information included in the operation pattern information indicates that character string information needs to be supplied to an application software program, character string information selected by the user is supplied to the started application software program and the character string information is subjected to predetermined processing by the application software program.

According to the above described detailed configuration, if character string information supply necessity information indicating that character string information needs to be supplied to an application software program is set, the character string information selected by the user is supplied to the started application software program as described above, and it is thereby possible to eliminate the necessity for an operation of inputting the character string information after the application software program is started and achieve a higher degree of convenience.

To be more specific, the starting means includes means for judging whether or not the number of application software programs specified by the operation information included in the specified operation pattern information is plural, means for starting, when the number of application software programs specified by the operation information is judged not to be plural, the application software program, means for displaying, when the number of application software programs specified by the operation information is judged to be plural, a screen for selecting one application software program from among the plurality of application software programs, and means for starting, when an operation of selecting one application software program from among the plurality of application software programs is performed on the information input device, the selected application software program.

According to the above described detailed configuration, when the number of application software programs specified by the operation information included in the specified operation pattern information is one, for example, when the number of pieces of operation pattern information specified is one and the number of pieces of operation information included in the operation pattern information is one or when the number of pieces of operation pattern information specified is plural but operation information is the same, the application software program is started when the user performs the operation of selecting one piece of character string information as described above.

By contrast, when the number of application software programs specified by the operation information included in the specified operation pattern information is plural, for example, when the number of pieces of operation pattern information specified is plural and the respective pieces of operation information are different from each other or when the number of pieces of operation pattern information specified is one but the number of pieces of operation information included in the operation pattern information is plural, a screen for selecting one application software program from among the plurality of application software programs is displayed on the information display device and the application software program is started later when the user performs an operation of selecting one application software program.

The information terminal device according to the present invention allows the user to set operation pattern information, and can thereby achieve a higher degree of convenience than conventional ones.

BRIEF DESCRIPTION OF THE DRAWINGS

FIG. 14 is a diagram illustrating a mail document example that can start an application software program "scheduler";

FIG. 15 is a diagram illustrating a mail document example that can start an application software program "count down timer";

FIG. 16 is a diagram illustrating a mail document example that can start an application software program "ToDo list"; and FIG. 17 is a diagram illustrating a mail document example that can start application software programs "scheduler" and "ToDo list."

DETAILED DESCRIPTION

Hereinafter, an embodiment in which the present invention is applied to a cellular phone set will be described in detail according to the accompanying drawings.

Figures 1, 2:
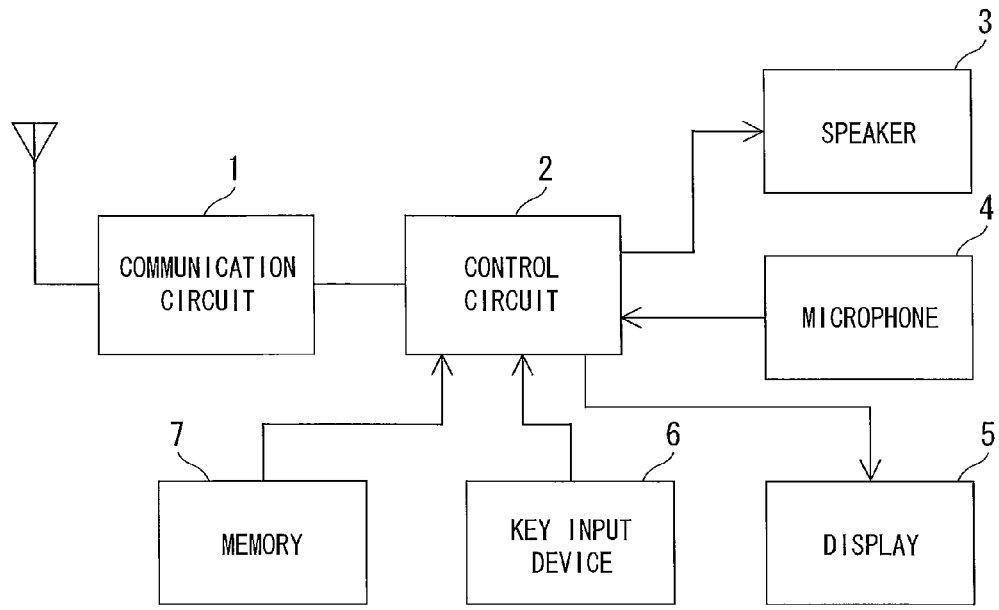
FIG. 1 is a block diagram illustrating a configuration of a cellular phone set to which the present invention is applied.
FIG. 2 is a diagram illustrating an operation pattern information table stored in a memory of the cellular phone set.

As shown in FIG. 1, the cellular phone set according to the present invention is provided with a control circuit (2) made up of a microcomputer and the control circuit (2) is connected with a communication circuit (1) for telephone communication and mail communication, a speaker (3) to receive a call, a microphone (4) to send a call, a display (5) to display various kinds of information, a key input device (6) provided with a numerical keypad and Enter key or the like and a memory (7) that stores an operation pattern information table which will be described later.

FIG. 2 shows the operation pattern information table and the table stores operation pattern information made up of a pattern name, character string pattern information, operation information, option information and validity/invalidity information for each operation pattern.

The character string pattern information is made up of character information such as characters, numbers or symbols, attribute information indicating attributes of characters, numbers or symbols or a combination of such information. For example, attribute information "Y" and "M" making up character string pattern information "YYMM" on pattern 1 denote "year" and "month", respectively, and attribute information making up character string pattern information "YY/MM/DD" denotes "day." Attribute information "H" and "m" making up character string pattern information "HHmm" on pattern 2 denote "hour" and "minute", respectively. Attribute information "X" making up character string pattern information "XX minutes" on pattern 3 denotes an arbitrary number.

The operation information indicates an application software program to be started. The option information is made up of character string information supply necessity information indicating whether or not character string information needs to be supplied to an application software program and startup information indicating an operation at the startup of the application software program or the like. When, for example, the application software program to be started is "scheduler," the startup information indicates which of a new registration screen to newly register a schedule or a normal startup screen made up of a calendar should be displayed at the startup. The validity/invalidity information indicates whether or not the character string pattern information is to be searched.

When a mail document indicating contents of a received mail is displayed on the display (5), the control circuit (2) shown in FIG. 1 searches character string information that matches character string pattern information included in operation pattern information whose validity/invalidity information is set to "valid" of the operation pattern information stored in the operation pattern information table in the mail document and stores the search result in a built-in memory. Here, when the character string pattern information includes attribute information of numbers, the character string information will be searched as will be described later.

That is, the built-in memory of the control circuit (2) defines a range of values that attribute information of numbers can take and when the character string information is searched, it is judged whether or not numbers included in the character string information are values within a defined range.

When, for example, "MMDD" made up of attribute information "M" indicating "month" and attribute information "D" indicating "day" is set as the character string pattern information, it is judged whether or not numbers of higher two digits of the character string information included in the mail document are values within a range of 01 to 12 first, and when the numbers are not values within the range of 01 to 12, it is judged that the character string information does not match the character string pattern information. When the numbers of higher two digits are values within the range of 01 to 12, it is judged whether numbers of the next two digits are values within a range of 01 to 31, and when the numbers are not values within the range of 01 to 31, it is judged that the character string information does not match the character string pattern information. On the other hand, when the numbers are values within the range of 01 to 31, it is judged that the character string information matches the character string pattern information. When the character string pattern information includes attribute information indicating "hour," it is judged whether or not numbers of two digits are values within a range of 00 to 24 and when attribute information "m" indicating "minute" or attribute information "s" indicating "second" is included, it is judged that the numbers of two digits are values within a range of 00 to 60.

After that, when the user performs a cursor operation, if the character string information obtained as a result of the search is included in the line of the cursor destination, the character string information is displayed in reverse video. In this way, when the user presses the Enter key while the character string information is displayed in reverse video, operation pattern information including character string pattern information that matches the character string information is specified from among the operation pattern information whose validity/invalidity information is set to "valid" and if the number of application software programs specified by the operation information included in the specified operation pattern information is one, for example, when the number of pieces of operation pattern information specified is one and the number of pieces of operation information included in the operation pattern information is one or when the number of pieces of operation pattern information specified is plural but the operation information is the same, the application software program is started and an application screen corresponding to the option information is displayed on the display (5).

On the contrary, when the number of application software programs specified by operation information included in the specified operation pattern information is plural, for example, when the number of pieces of operation pattern information specified is plural and the respective pieces of operation information are different from each other or when the number of pieces of operation pattern information specified is one but the number of pieces of operation information included in the operation pattern information is plural, a function calling menu screen to select one application software program from a plurality of application software programs is displayed on the display (5) and later when the user selects one application software program, the selected application software program is started and an application screen corresponding to the option information is displayed on the display (5).

Figure 7:
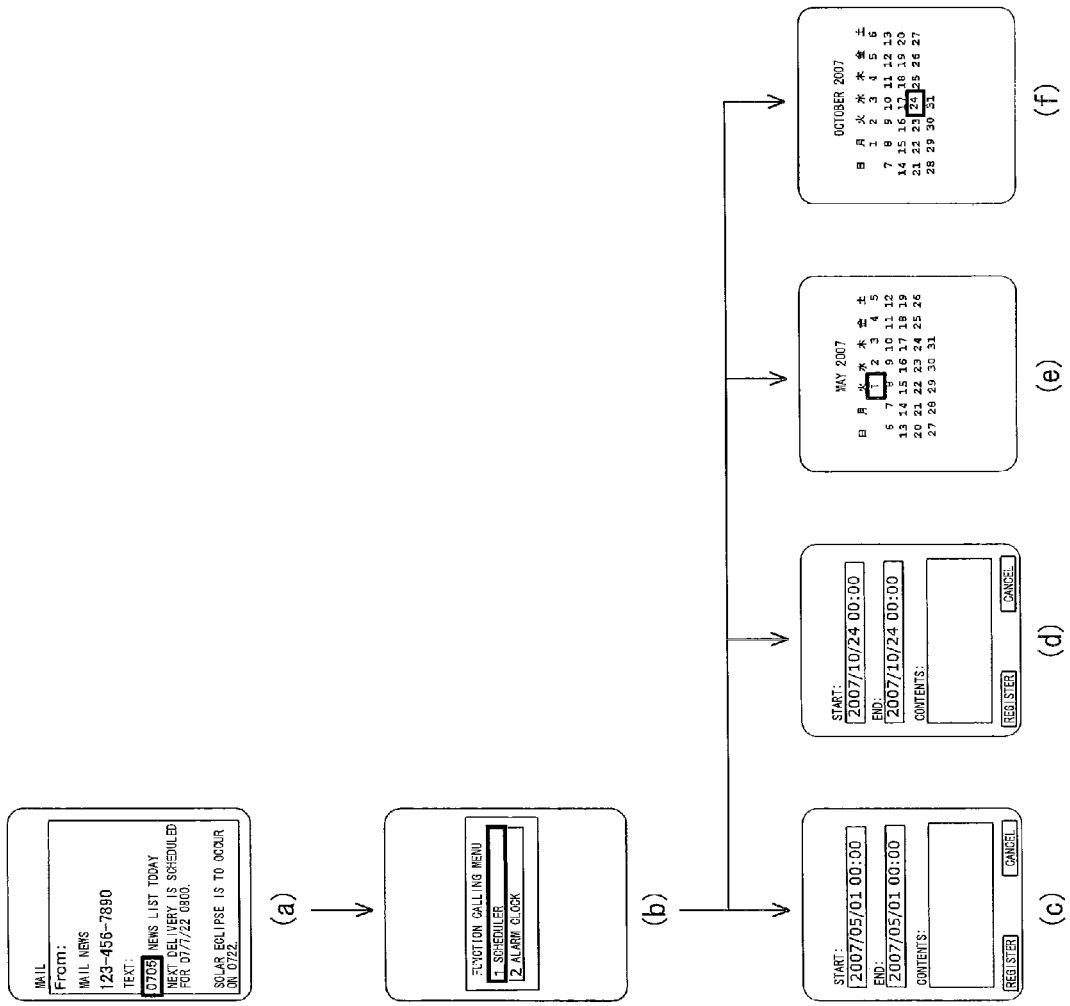
FIG. 7 is a diagram illustrating a mail document screen, a function calling menu screen and an application screen displayed when an application software program "scheduler" is started.

When, for example, a mail document shown in FIG. 7(*a*) is displayed on the display while the operation pattern information table of the contents shown in FIG. 2 is stored in the memory, it is judged that character string information "0705", "07/7/22", "0800" and "0722" making up the mail document matches the character string pattern information on patterns 1 and 2. After that, when the user moves the cursor to the line where character string information "0705" is displayed, the character string information is displayed in reverse video. FIG. 7(*a*) shows that the character string information is displayed in reverse video by enclosing the character string information with a rectangular frame.

When the user presses the Enter key while the character string information "0705" is displayed in reverse video as described above so as to select the character string information, since the character string information matches character string pattern information "YYMM" on pattern 1 and character string pattern information "HHmm" and "MMDD" on pattern 2, as shown in FIG. 7(*b*), a function calling menu screen to select any one application software program from among application software program "scheduler" indicated by the operation information on pattern 1 and an application software program "alarm clock" indicated by the operation information on pattern 2 is displayed on the display.

If the user selects the application software program "scheduler" on pattern 1 while the function calling menu screen is displayed on the display, the application software program is started and an application screen corresponding to the option information on pattern 1 is displayed on the display as will be described later.

When the option information indicates that the character string information needs to be supplied to an application software program and that a new registration screen should be displayed, an application screen shown in FIG. 7(*c*) is displayed. Since the character string information is "0705" and the character string pattern information on pattern 1 is "YYMM," "2007/05/01" is displayed in the fields of "start" and "end." Here, the display method and sequence are changed to a method and sequence corresponding to the application software program by the function of the application software program. As an example where the display sequence is changed, while the character string pattern information is "MMDDYY," if the sequence required by the application software program is "YYMMDD" and the character string information supplied to the application software program is "120189," the character string information is rearranged to "891201."

When the option information indicates that the character string information need not be supplied to the application software program and that a new registration screen should be displayed, an application screen shown in FIG. 7(*d*) is displayed. When the day on which the screen was displayed is Oct. 24, 2007, year, month, day "2007/10/24" which is the date on which the screen was displayed is displayed in the fields of "start" and "end."

When the option information indicates that the character string information needs to be supplied to the application software program and that a normal startup screen should be displayed, an application screen shown in FIG. 7(*e*) is displayed. Since the character string information is "0705" and the character string pattern information on pattern 1 is "YYMM," a calendar of May 2007 is displayed and date "1" is enclosed by a rectangular frame.

When the option information indicates that the character string information need not be supplied to an application software program and that a normal startup screen should be displayed, an application screen shown in FIG. 7(*f*) is displayed. When the date on which the screen was displayed is Oct. 24, 2007, a calendar of October 2007 is displayed and the date "24" is enclosed by a rectangular frame.

Furthermore, if the user selects the application software program "alarm clock" on pattern 2 while the function calling menu screen shown in FIG. 7(*b*) is displayed on the display, the application software program is started and an application screen corresponding to option information on pattern 2 is displayed on the display as described below.

Figures 8, 9:
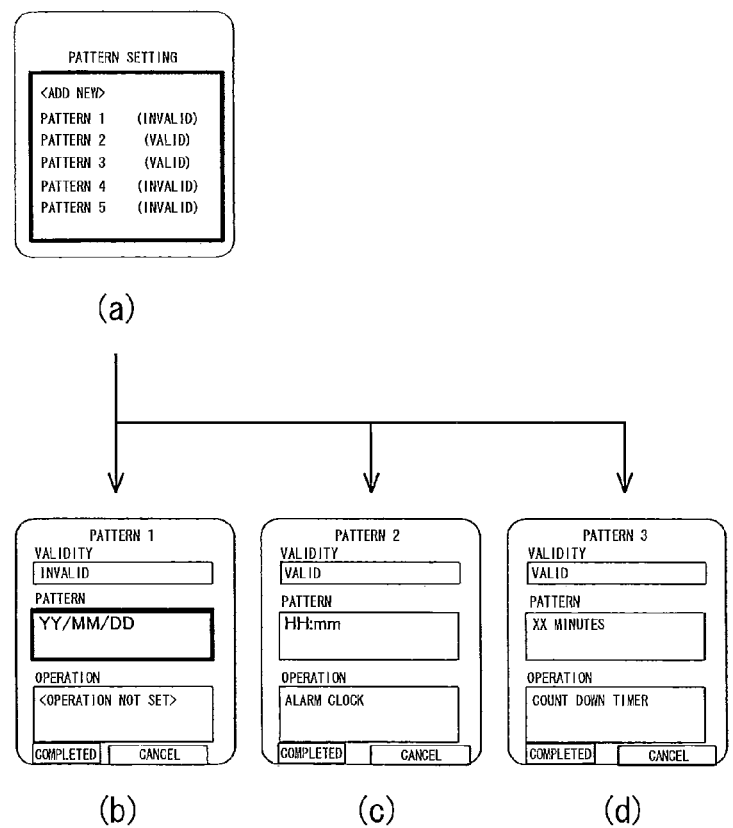
FIG. 8 is a diagram illustrating an application screen displayed when an application software program "alarm clock" is started.
FIG. 9 is a diagram illustrating an operation pattern information screen displayed when an operation pattern information list screen and operation pattern information are selected.

When the option information indicates that the character string information needs to be supplied to the application software program and that a new registration screen should be displayed, an application screen shown in FIG. 8(*a*) is displayed. Since the character string information is "0705" and the character string pattern information on pattern 2 is "HHmm," "07:05" is displayed in the field of "notification time."

When the option information indicates that the character string information need not be supplied to the application software program and that a new registration screen should be displayed, an application screen shown in FIG. 8(*b*) is displayed. When the time at which the screen was displayed is 8:20, the time "08:20" at which the screen was displayed is displayed in the field of "notification time."

When the option information indicates that a normal startup screen should be displayed, an application screen is displayed which shows a list of alarm times set at that point in time as shown in FIG. 8(*c*) irrespective of whether or not the option information indicates that character string information needs to be supplied to the application software program.

Furthermore, if the user moves the cursor to character string information "07/7/22" and presses the Enter key while the mail document shown in FIG. 7(*a*) is displayed on the display, since the character string information only matches the character string pattern information "YY/MM/DD" on pattern 1, the application software program "scheduler" specified by the operation information on pattern 1 is started and an application screen corresponding to the option information on pattern 1 is displayed on the display.

The cellular phone set according to the present invention can change or add operation pattern information and when operation pattern information is changed or added, an operation pattern information list screen shown in FIG. 9(a) is displayed on the display first. The screen shows a pattern name of one or a plurality of pieces of operation pattern information set at that point in time and validity of each piece of operation pattern information, and in the example shown in FIG. 9(a), operation pattern information on pattern 2 and operation pattern information on pattern 3 are set to "valid" of the five pieces of operation pattern information.

Of the above described five pieces of operation pattern information, when, for example, operation pattern information on pattern 1 is selected, an operation pattern information screen is displayed on the display indicating setting contents of the operation pattern information shown in FIG. 9(b). The screen displays validity/invalidity information of the operation pattern information, character string pattern information and operation information, and in the example shown in FIG. 9(b), "invalid" is set as validity/invalidity information and "YY/MM/DD" is set as character string pattern information and nothing is set as operation information.

Furthermore, when operation pattern information on pattern 2 is selected, an operation pattern information screen shown in FIG. 9(c) is displayed on the display. In the example shown in FIG. 9(c), "valid" is set as validity/invalidity information, "HH:mm" is set as character string pattern information and "alarm clock" is set as operation information.

Furthermore, when operation pattern information on pattern 3 is selected, an operation pattern information screen shown in FIG. 9(d) is displayed on the display. In the example shown in FIG. 9(d), "valid" is set as validity/invalidity information, "XX minutes" is set as character string pattern information and "count down timer" is set as operation information.

On pattern 4 and pattern 5, validity/invalidity information of operation pattern information, character string pattern information and operation information are also displayed in the same way as for patterns 1 to 3.

Figure 10:
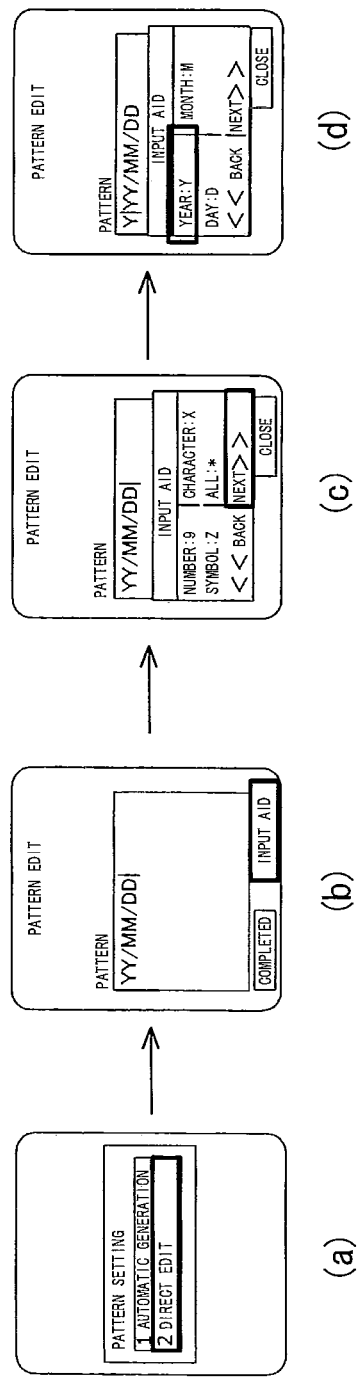
FIG. 10 is a diagram illustrating a screen for selecting a method of setting character string pattern information and a pattern edit screen displayed when character string pattern information is set using a direct edit method.

If "pattern" is selected to change operation pattern information on pattern 1 while the screen shown in FIG. 9(b) is displayed on the display, a screen shown in FIG. 10(a) to select a method of setting character string pattern information is displayed on the display. The above described cellular phone set allows the user to select any one of an "automatic generation" method of automatically generating character string pattern information from the character string information inputted by the user and a "direct edit" method for the user to directly edit character string pattern information.

When the "direct edit" method is selected as shown in FIG. 10(a), a pattern edit screen shown in FIG. 10(b) is displayed on the display. If character string pattern information is already set at that point in time, the screen displays the character string pattern information. In the example shown in FIG. 10(b), character string pattern information "YY/MM/DD" is already set.

Next, if "Input aid" is selected, attribute information that can be inputted is displayed in the lower part of the display as shown in FIG. 10(c), and the attribute information is scrolled and displayed when "Back" or "Next" is selected. For example, by selecting "Next" to display a screen shown in FIG. 10(d) on the display and moving the cursor to the start of character string pattern information "YY/MM/DD" and then selecting "year: Y," attribute information can be added to the start of character string pattern information "YY/MM/DD." Character string information and attribute information can also be entered through an operation on a numerical keypad.

Figure 12:
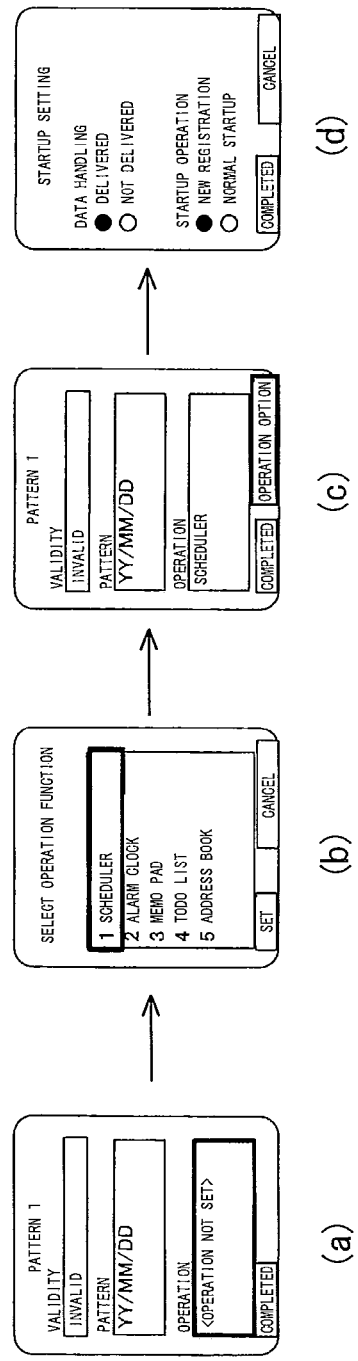
FIG. 12 is a diagram illustrating a screen displayed when operation information and option information are set.

When "Close" is selected after the character string pattern information is inputted as described above, the screen is returned to the pattern edit screen shown in FIG. 10(b) and when "Completed" is selected, the screen is returned to the operation pattern information screen shown in FIG. 12(a).

Figure 11:
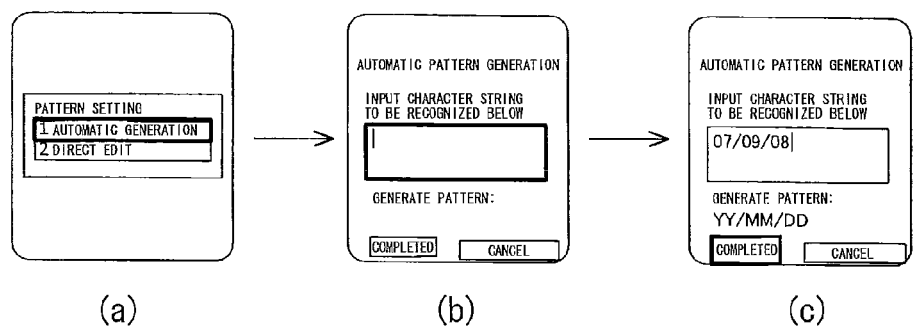
FIG. 11 is a diagram illustrating a screen for selecting a method of setting character string pattern information and an automatic pattern generation screen displayed when character string pattern information is set using an automatic generation method.

By contrast, when an "automatic generation" method shown in FIG. 11(a) is selected, an automatic pattern generation screen shown in FIG. 11(b) is displayed on the display, and if, for example, character string information "07/09/08" is inputted as shown in FIG. 11(c) while the screen is displayed, the character string information is converted to character string pattern information "YY/MM/DD" and the character string pattern information is displayed on the display as shown in the figure. The built-in memory of the control circuit stores a rule defining a relationship between character string information and character string pattern information and a conversion from character string information to a character string pattern is performed according to the rule. After that, when "Completed" is selected, the screen is returned to the operation pattern information screen shown in FIG. 12(a).

When "Operation" is selected while the operation pattern information screen shown in FIG. 12(a) is displayed on the display, an operation function selection screen shown in FIG. 12(b) is displayed on the display. The screen displays function names of application software programs that can be started when character string information that matches the character string pattern information set as described above exists in the mail document. In the above described cellular phone set, five application software programs "Scheduler", "Alarm clock", "Memo pad", "ToDo list" and "Address book" can be started. "ToDo list" is an application software program to list things the user has to do.

When "Scheduler" is selected, "Scheduler" is displayed in the field of "Operation" of the operation pattern information screen as shown in FIG. 12(c) and later when "Operation option" is selected, a startup setting screen shown in FIG. 12(d) is displayed on the display. Check boxes for setting the above described character string information supply necessity information to make up option information and check boxes for setting startup information are displayed on the screen.

After the check boxes are checked, if "Completed" is selected, the screen is returned to the operation pattern information screen shown in FIG. 12(c) and if "Completed" is selected, the screen is returned to the operation pattern information list screen shown in FIG. 9(a).

Figure 13:
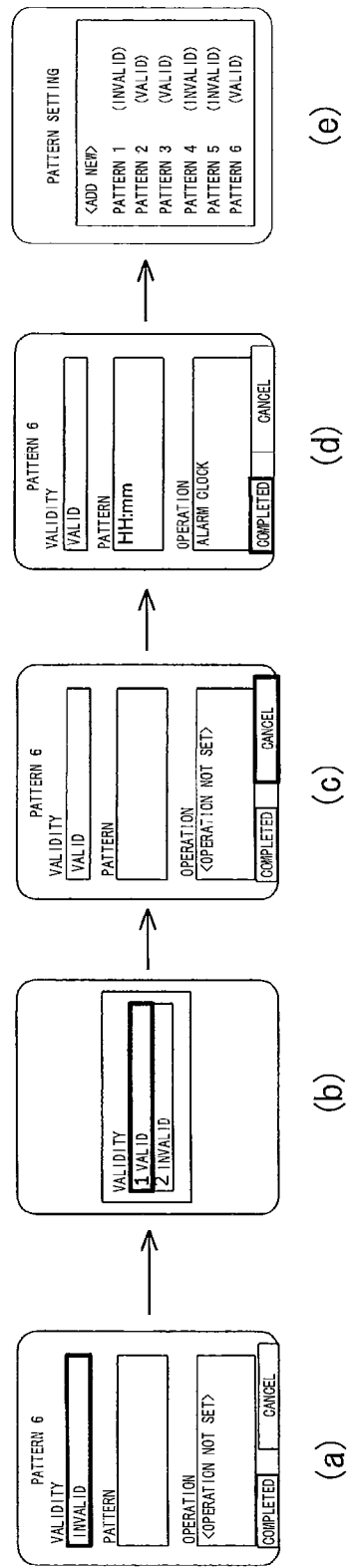
FIG. 13 is a diagram illustrating a screen displayed when operation pattern information is newly registered.

Furthermore, when "Add new" is selected while the above described operation pattern information list screen is displayed on the display so as to add operation pattern information, a screen for newly registering operation pattern information on pattern 6 is displayed on the display as shown in FIG. 13(a).

When "validity" is selected, a validity selection screen shown in FIG. 13(b) is displayed on the display, and if, for example, "valid" is selected, "valid" is displayed in the "validity" field of the operation pattern information screen as shown in FIG. 13(c). After that, when character string pattern information and operation information are inputted as in the case where the operation pattern information is changed, character string pattern information and operation information are displayed in the field of "pattern" and the field of "operation" of the operation pattern information screen respectively as shown in FIG. 13(d) and if "Completed" is selected finally, the screen is returned to the operation pattern information list screen where the operation pattern information on pattern 6 is added as shown in FIG. 13(e).

The above described selection can be performed by moving the cursor on the screen to an item to be selected using the arrow key of the key input device and pressing the Enter key. Furthermore, a plurality of pieces of character string pattern information and operation information can also be set for one pattern and the option information can be set for each piece of operation information.

Figure 3:
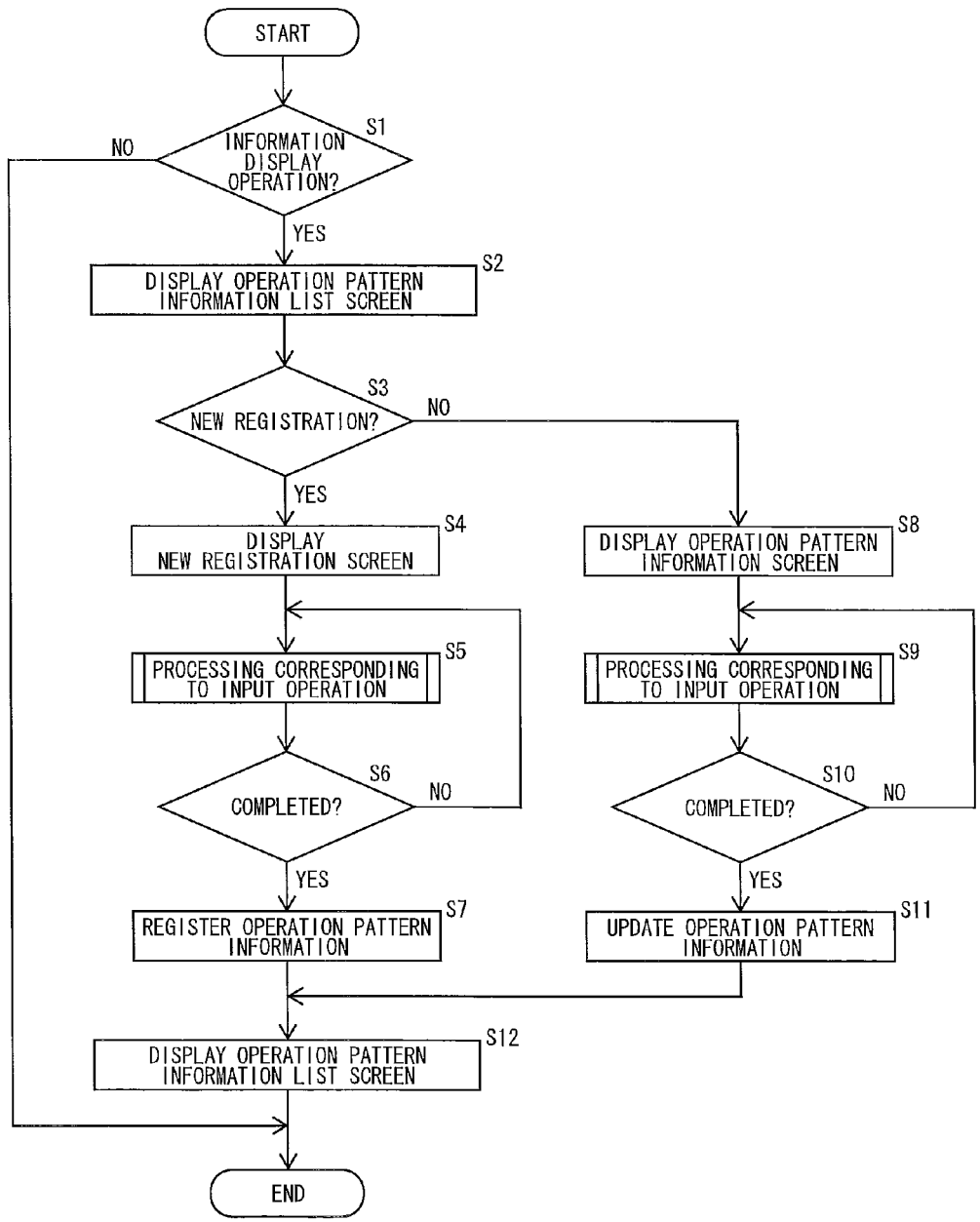
FIG. 3 is a flowchart illustrating an operation pattern information setting procedure executed by the cellular phone set.

FIG. 3 shows an operation pattern information setting procedure by the above described control circuit (2). First, it is judged in step S1 whether or not information display operation has been performed and when judged "No," the procedure ends, and on the other hand, when judged "Yes," the process moves to step S2 and after an operation pattern information list screen is displayed on the display, it is judged in step S3 whether or not "New registration" is selected.

When "New registration" is selected and judged "Yes" in step S3, a new registration screen is displayed on the display in step S4, and in step S5, processing of storing information in the built-in memory and processing of displaying the information on the display are performed according to an information input operation by the user. Next, in step S6, it is judged whether or not "Completed" is selected, and when judged "No," the process returns to step S5, and on the other hand when judged "Yes", the process moves to step S7, where the operation pattern information stored in a defined area of the built-in memory is newly registered with the operation pattern information table shown in FIG. 2, and then an operation pattern information list screen is displayed on the display in step S12 and the procedure is ended.

By contrast, when one pattern is selected while the operation pattern information list screen is displayed on the display and judged "No" in step S3 above, the operation pattern information on the selected pattern is read from the operation pattern information table and stored in the built-in memory in step S8, and an operation pattern information screen indicating the setting contents of the operation pattern information is displayed on the display, and then in step S9, processing of changing the operation pattern information stored in the built-in memory as described above and processing of displaying the operation pattern information on the display are performed according to an information input operation by the user. Next, in step S10, it is judged whether or not "Completed" is selected, and when judged "No," the process returns to step S9, and on the other hand when judged "Yes," the process moves to step S11 and, the operation pattern information on the selected pattern out of the operation pattern information stored in the operation pattern information table shown in FIG. 2 is updated to the operation pattern information stored in the defined area of the built-in memory, and the operation pattern information list screen is then displayed on the display in step S12 and the procedure is ended.

The operation pattern information is added and changed by the above described procedure.

Figure 4:
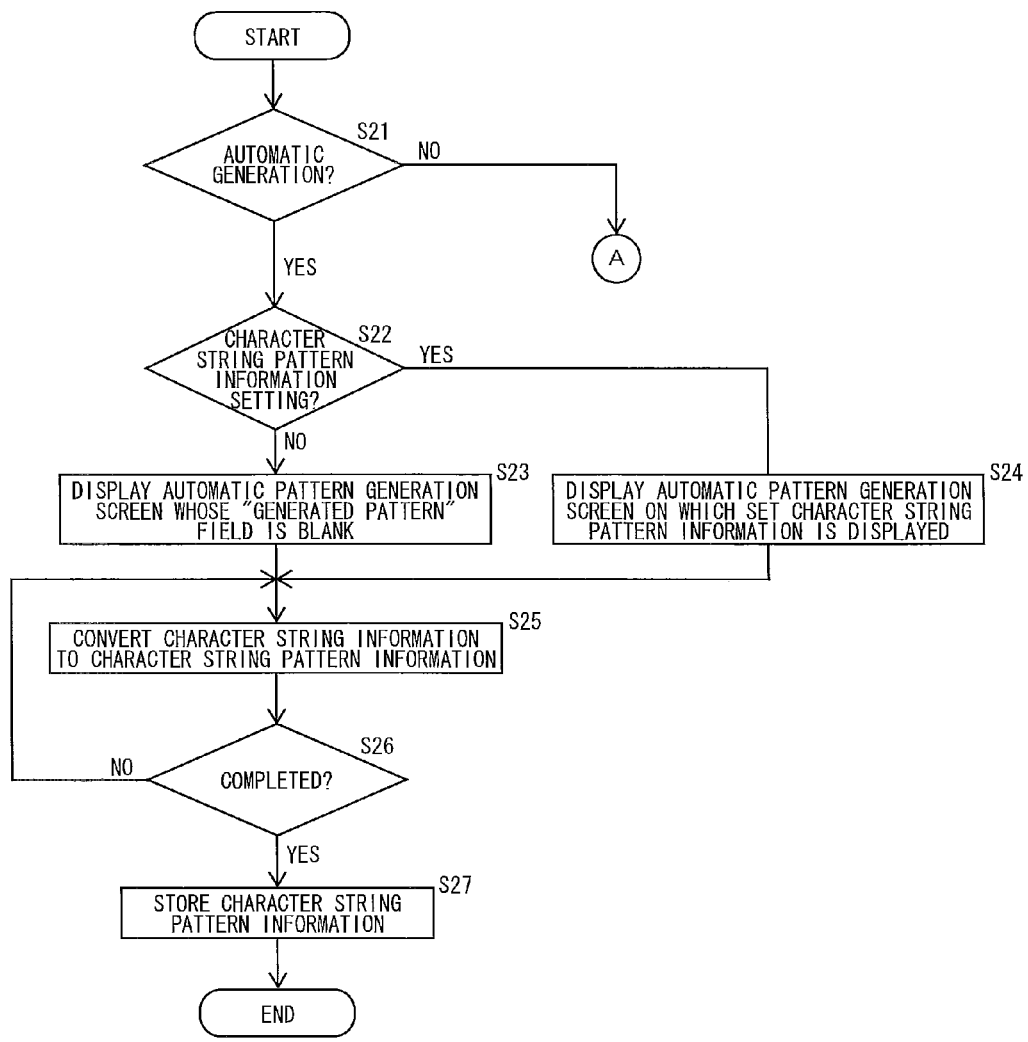
FIG. 4 is a flowchart illustrating a character string pattern information setting procedure executed by the cellular phone set.
Figure 5:
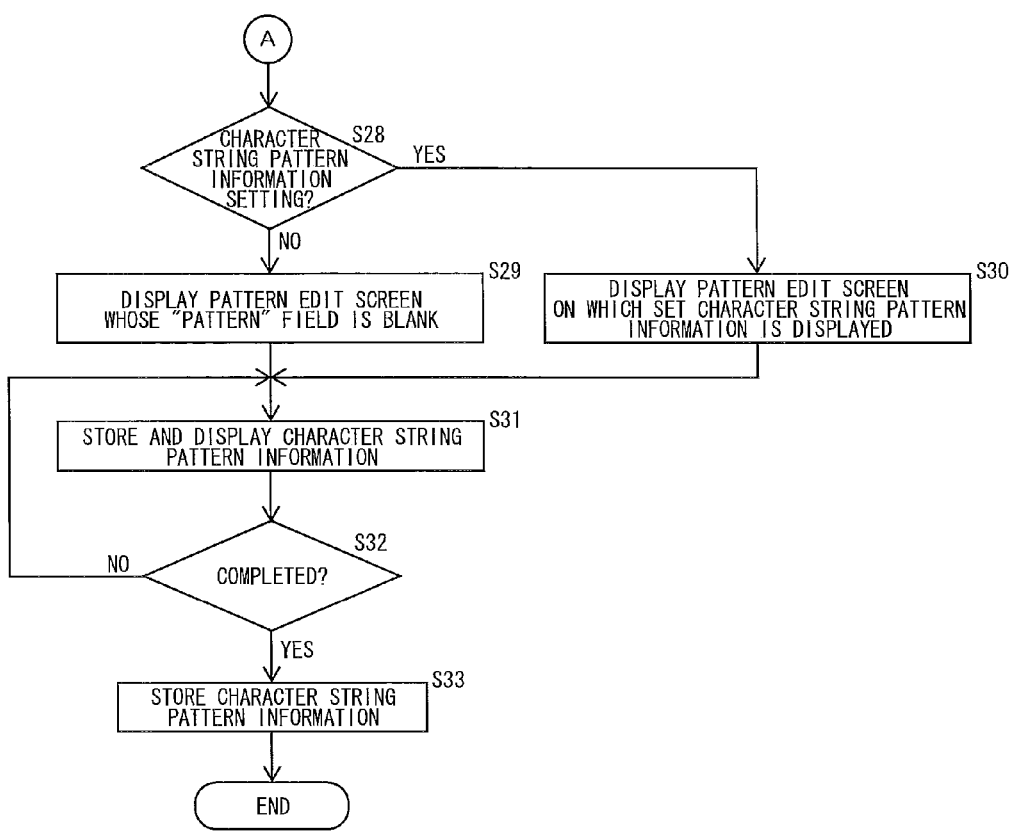
FIG. 5 is a diagram illustrating a branch of FIG. 4.

FIG. 4 and FIG. 5 illustrate a character string pattern information setting procedure executed in step S5 and step S9 above. First, it is judged in step S21 whether or not the "automatic generation" method has been selected, and when judged "Yes," the process moves to step S22, where it is judged whether or not the character string pattern information has already been set, and when judged "No," an automatic pattern generation screen whose "Generated pattern" field is blank is displayed on the display in step S23 and the process then moves to step S25. On the other hand, when judged "Yes," an automatic pattern generation screen on which the character string pattern information already set in the "Generated pattern" field in step S24 is displayed is displayed on the display, and the process then moves to step S25.

In step S25, the character string information is converted to character string pattern information according to the rule stored in the built-in memory in response to the operation of inputting character string information by the user, and after performing processing of storing the character string pattern information in a temporary area of the built-in memory and processing of displaying the character string pattern information in the "Generated pattern" field of the automatic pattern generation screen, it is judged in step S26 whether or not "Completed" is selected, and when judged "No," the process returns to step S25, and on the other hand, when judged "Yes," the character string pattern information stored in the temporary area of the built-in memory is stored in the defined area in step S27 and the procedure is ended.

When the "Direct edit" method is selected and judged "No" in step S21 above, the process moves to step S28 in FIG. 5, where it is judged whether or not the character string pattern information has already been set and when judged "No," a pattern edit screen whose "Pattern" field is blank is displayed on the display in step S29 and the process then moves to step S31, and on the other hand, when judged "Yes" in step S28, a pattern edit screen on which the character string pattern information whose "Pattern" field has already been set in step S30 is displayed is displayed on the display and the process then moves to step S31.

In step S31, according to an operation of inputting character string pattern information by the user, processing of storing the character string pattern information in a temporary area of the built-in memory and processing of displaying the character string pattern information in the "pattern" field of the pattern edit screen are performed and it is then judged in step S32 whether or not "Completed" has been selected, and when judged "No," the process returns to step S31, and on the other hand, when judged "Yes," the character string pattern information stored in the temporary area of the built-in memory is stored in the defined area in step S33 and the procedure is ended.

The character string pattern information stored in the defined area of the built-in memory by the above described procedure is then registered with the operation pattern information table.

Figure 6:
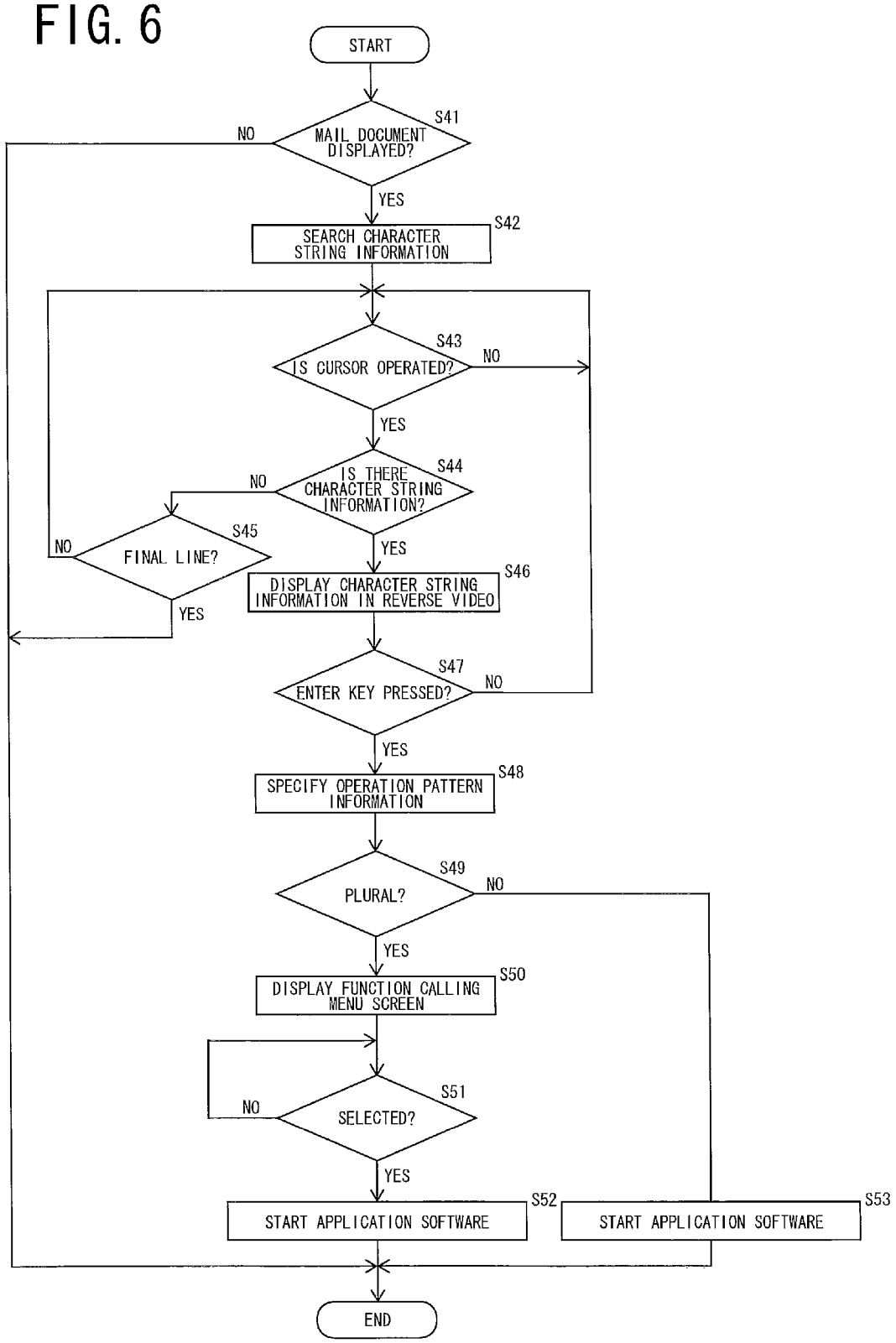
FIG. 6 is a flowchart illustrating an application software program starting procedure executed by the cellular phone set.

FIG. 6 illustrates an application software starting procedure by the above described control circuit (2). First, it is judged in step S41 whether or not a mail document is displayed on the display and when judged "No," the procedure is ended, and on the other hand, when judged "Yes," the process moves to step S42, where character string information that matches the character string pattern information included in the operation pattern information whose validity/invalidity information is set to "Valid" out of the operation pattern information stored in the operation pattern information table is searched in the mail document and the search result thereof is stored in the built-in memory.

Next, it is judged in step S43 whether or not a cursor operation has been performed, and when judged "No," the same judgment is repeated in step S43, and when the cursor operation is performed and judged "Yes," the process moves to step S44, where it is judged whether or not there is character string information that matches the character string pattern information on the line of the cursor destination. Here, when judged "No," the process moves to step S45, where it is judged whether or not the cursor destination is the final line of the mail document and when judged "No," the process returns to step S43.

When there is character string information that matches the character string pattern information on the line of the cursor destination and judged "Yes" in step S44, the character string information is displayed in reverse video in step S46, the process then moves to step S47, where it is judged whether or not the Enter key is pressed, and when judged "No," the process returns to step S43.

When there is no character string information that matches the character string pattern information in the mail document, it is finally judged "Yes" in step S45 and the procedure is ended. Before ending the procedure, the end of the procedure may be displayed on the display so as to be informed to the user.

After that, if the Enter key is pressed while character string information is displayed in reverse video and judged "Yes" in step S47, the process moves to step S48, where operation pattern information including character string pattern information that matches the character string information displayed in reverse video is specified from the operation pattern information whose validity/invalidity information is set to "valid," it is then judged in step S49 whether or not the number of application software programs specified by the operation information included in the specified operation pattern information is plural.

When judged "Yes" in step S49, a function calling menu screen for selecting one application software program from the plurality of application software programs is displayed on the display in step S50, it is then judged in step S51 whether or not one application software program has been selected and when judged "No," the same judgment is repeated in step S51. When one application software program is selected and judged "Yes" in step S51, the selected application software program is started in step S52, an application screen corresponding to the option information is displayed on the display and the procedure is ended. Here, when the option information indicates that the character string information needs to be supplied to the application software program, the character string information displayed in reverse video when the Enter key is pressed is supplied to the application software program.

When the number of application software programs specified by the operation information included in the specified operation pattern information is one and judged "No" in step S49, the process moves to step S53, where the application software program is started and an application screen corresponding to the option information is displayed on the display and the procedure is ended. Here, when the option information indicates that the character string information needs to be supplied to the application software program, the character string information displayed in reverse video when the Enter key is pressed is supplied to the application software program.

In the above described cellular phone set, if an operation of selecting character string information in the mail document is performed through a cursor operation while a mail document is displayed on the display, an application software program corresponding to the character string information is started and an application screen is displayed on the display, and therefore a high degree of convenience can be obtained.

A configuration has been described in the above described embodiment where a search of character string information is performed when a mail document indicating contents of the received mail is displayed on the display (5), but a search of character string information can be likewise performed also when various documents including one or a plurality of pieces of character string information such as a mail document indicating contents of a mail to be sent and a site on the Internet are displayed.

With the above described cellular phone set according to the present invention, the user can change and add operation pattern information as described above, and it is thereby possible to achieve a higher degree of convenience than conventional ones.

Furthermore, if information indicating that character string information needs to be supplied to an application software program is set as option information, the character string information selected by the user is supplied to the application software program to be started, which eliminates the necessity for an operation of inputting the character string information after the application software program is started, and can obtain a still higher degree of convenience.

If various kinds of character string pattern information and operation information are set, it is possible to start various kinds of application software programs by selecting various kinds of character string information in a mail document.

FIG. 14 to FIG. 17 illustrate examples of mail documents and, for example, the application software program "scheduler" can be started by selecting character string information "2007/01/23 10:00" while a mail document shown in FIG. 14 is displayed on the display. The application software program "count down timer" can be started by selecting character string information "10 minutes" while a mail document shown in FIG. 15 is displayed on the display. The application software program "ToDo list" can be started by selecting character string information "ToDo" while a mail document shown in FIG. 16 is displayed on the display. The application software program "scheduler" can be started by selecting character string information "2/1" while a mail document shown in FIG. 17 is displayed on the display and the application software program "ToDo list" can be started by selecting character string information "ToDo."

Furthermore, it is also possible to start an application software program for realizing a telephone communication function and an application software program for realizing a mail communication function. For example, by selecting character string information "Make a call" in a mail document, it is possible to start the application software program for realizing the telephone communication function and cause the display (5) to display a transmission screen on which a telephone number can be entered. Moreover, by selecting a name such as "Yamamoto" set as character string pattern information beforehand, it is possible to cause the display (5) to display a function calling menu screen for selecting any one of the application software program for realizing a telephone communication function and the application software program for realizing a mail communication function and then start the selected application software program.

The configurations of the respective sections of the present invention are not limited to those of the above described embodiment, but can be modified in various ways without departing from the technical scope described in the scope of claims.

For example, although the present invention is applied to a cellular phone set in the above described embodiment, the present invention is not limited to this and can also be applied to various kinds of information terminal device.

The invention claimed is:

1. An information terminal device having a plurality of application software programs, the information terminal device comprising:
   a registering unit that receives a character string pattern based on user inputs, wherein the character string pattern comprises one or more of a character, a number, a symbol, or an attribute of a character, number, or symbol,
   retrieving one or more rule defining a relationship between character string information and character string pattern information and a conversion from character string information to a character string pattern is performed according to the rule;
   receives an indication of an application software program, and
   stores the received character string pattern in association with the indicated application software program;

a display unit that displays a document;

a searching unit that searches the displayed document for one or more character strings that match the stored character string pattern;

a selection unit that receives a selection of one of the one or more matched character strings in the document; and a starting unit that starts the application software program associated with the character string pattern.

2. The information terminal device according to claim 1, wherein receiving the character string pattern based on user inputs comprises:

displaying an input for a character string pattern;

displaying a plurality of attributes available to be added to the input for the character string pattern;

receiving a selection of one or more of the plurality of attributes; and, in response to the selection of the one or more attributes, adding the one or more attributes to the input for the character string pattern.

3. An information terminal device having a plurality of application software programs, the information terminal device comprising:

an input device;

an information storing unit storing one or more operation pattern associations, wherein each of the one or more operation pattern associations comprise a character string pattern and an identification of an application software program associated with the character string pattern and a validity field that indicates that the operation pattern association is either valid or not valid;

an information processing unit storing that generates an operation pattern association based on a character string pattern and an indication of an application software program input by a user via the input device, and stores the generated operation pattern association;

a searching unit that, in response to a document being displayed on the information display device, searches the document for one or more character strings that match one or more character string patterns in one or more operation pattern associations and an indication that the operation pattern association is valid;

a search result display processing unit that displays a result of the search performed by the searching unit; and a starting unit that, when a selection of one of the one or more matched character strings is performed via the input device, the application software program, that is associated in a corresponding one of the one or more operation pattern associations with the character string pattern that matches the selected character string, is started.

4. The information terminal device according to claim 3, further comprising:

an operation pattern association display processing unit that displays the one or more operation pattern associations stored in the information storing unit according to an operation on the input device;

a read processing unit that, when a selection of one of the one or more displayed operation pattern associations is performed on the input device, the selected operation pattern association is retrieved from the information storing unit; and a change processing unit modifies the retrieved operation pattern association according to one or more user operations performed via the input device, and stores the modified operation pattern association in the information storing unit.

5. The information terminal device according to claim 3, wherein the search result display processing unit:

displays the result of the search while the document is displayed on the information display device; and when a cursor operation is performed via the input device while the document is displayed on the information display device and there is at least one of the one or more matched character strings a destination of the cursor operation, visually distinguishes the at least one matched character string from other ones of the one or more matched character strings.

6. The information terminal device according to claim 3, wherein each of the one or more operation pattern associations further comprises an indication of whether or not a character string is to be supplied to the associated application software program, and wherein, when the corresponding operation pattern association comprises an indication that the character string information is to be supplied to the application software program, the starting unit supplies the selected character string to the application software program associated, in the corresponding operation pattern association, with the character string pattern that matches the selected character string.

7. The information terminal device according to claim 3, wherein the starting unit comprises:

a unit that judges whether or not there are a plurality of application software programs that are associated in the one or more pattern associations with character string patterns that match the selected character string;

a unit that, when it is judged that there are not a plurality of associated application software programs, starts the associated application software program;

a unit that, when it is judged that there are a plurality of associated application software programs, displays a screen for selecting one application software program from the plurality of associated application software programs; and a unit that, when the one application software program is selected from the plurality of associated application software programs, starts the selected application software program.

8. The information terminal device according to claim 3 wherein the information processing unit further generates an operation pattern association based on a selection of an indication of valid or not valid by the user via the input device.

* * * * *